April 5, 1966   J. M. STINSON ET AL   3,244,500
INCORPORATION OF MICRONUTRIENTS IN FERTILIZERS
Filed July 25, 1963   2 Sheets-Sheet 1

John M. Stinson
Horace C. Mann Jr. INVENTORS.

BY Robert A. Petrusch
Agent

United States Patent Office 3,244,500
Patented Apr. 5, 1966

3,244,500
INCORPORATION OF MICRONUTRIENTS
IN FERTILIZERS
John M. Stinson, Sheffield, and Horace C. Mann, Jr., Florence, Ala., assignors to Tennessee Valley Authority, a corporation of the United States
Filed July 25, 1963, Ser. No. 297,725
9 Claims. (Cl. 71—1)

The invention herein described may be manufactured and used by or for the Government for governmental purposes with the payment to us of any royalty therefor.

Our invention relates to the incorporation of micronutrients in solid and liquid fertilizers containing ammonium polyphosphates, and more particularly to processes whereby less expensive water-insoluble sources of micronutrients, such as oxides, are used rather than the more expensive water-soluble sources such as sulfates currently incorporated in some solid fertilizers.

There is an increasing need for supplying micronutrients in solid and liquid fertilizers because the natural supply is being exhausted in many soils. This need has been accentuated by use of high-analysis fertilizers containing relatively little micronutrients and by increased crop yields which remove more micronutrients from the soil. Incorporating micronutrients in fertilizers will be more convenient to the farmer than separate application. Also, the increasing publicity of the use of micronutrient elements has increased the demand.

The micronutrient elements that are being considered are iron, zinc, copper, and manganese. At the present time, these elements are supplied in solid fertilizers generally as water-soluble sulfate salts; these salts are only sparingly soluble in liquid fertilizers made from standard (ortho) phosphoric acid. Such work is described in J. Agr. Food Chem. 7, 623 (September 1959). When water-insoluble micronutrient sources, such as oxides, are incorporated in liquid fertilizers prepared from orthophosphoric acid or in conventional solid fertilizers they remain in water-insoluble form.

However, in our process we are able for the first time to convert water-insoluble micronutrient sources, such as the oxides, to a water-soluble form and thereby render them useful for incorporation in fertilizers. In our process the micronutrient source may be dissolved in superphosphoric acid and the acid ammoniated at elevated pressures (in the range from about 10 p.s.i.g. to about 1000 p.s.i.g.) and temperatures (in the range from about 300° F. to about 500° F.) to produce molten ammonium polyphosphate which is then granulated. Except for the step in which the micronutrients are dissolved in the acid, the process is similar to that described in the copending applications of T. P. Hignett et al., Serial No. 136,960, filed September 8, 1961, now U.S. Patent No. 3,171,733, and Serial No. 227,664, filed September 27, 1962, both for High-Analysis Ammonium Polyphosphate Fertilizers and both assigned to the assignee of the present invention. Alternatively the acid and ammonia may first be reacted to form ammonium polyphosphate and the micronutrient source then added to the melt prior to or during granulation. The ammonium polyphosphate so produced containing the micronutrients can subsequently be dissolved in water and ammonia to produce nitrogen-phosphate liquid fertilizers with grades such as 10-34-0 and 11-37-0. Alternatively the normally water-insoluble micronutrient sources may be dissolved directly in superphosphoric acid and said superphosphoric acid subsequently ammoniated by a process similar to that described in U.S. Letters Patent 2,950,961, Marcus M. Striplin, Jr., et al., assigned to the assignee of the present invention, thereby directly producing a liquid mixed fertilizer containing the desirable micronutrient sources rendered water soluble and available to the growing plant.

In the above disclosures, the term "superphosphoric acid" as used in the specification and claims thereof is defined as phosphoric acid containing quantities of both ortho- and polyphosphoric acids. The polyphosphoric acids include pyrophosphoric acid and other polymers from the tri- to the nonapolymer and higher. The proportions of the polyphosphoric acids vary with the $P_2O_5$ content of the superphosphoric acid. The Canadian Journal of Chemistry, vol. 34, 1956, pages 790 and 791, shows that unammoniated electric furnace type superphosphoric acid in the range from about 61.81 to 84.15 percent $P_2O_5$ contains the following proportions of orthophosphoric acid and polyphosphoric acids expressed as percent of total phosphorus.

|  | Percent |
|---|---|
| Ortho- | 97.85–2.32 |
| Pyro- | 2.15–49.30 |
| Tri- | 0.00–24.98 |
| Tetra- | 0.00–16.99 |
| Penta- | 0.00–12.64 |
| Hexa- | 0.00–9.75 |
| Hepta- | 0.00–8.62 |
| Oxta- | 0.00–7.85 |
| Nona- | 0.00–6.03 |
| Higher polymers | 0.00–29.41 |

However, our work has indicated that a shift in distribution of the phosphate species differing from that reported above occurs when superphosphoric acid is ammoniated under anhydrous conditions. We have produced an ammonium polyphosphate containing as much as 84 percent of its $P_2O_5$ in a pyrophosphate form.

Alternatively, if wet-process phosphoric acid is concentrated from the usual maximum of about 54 percent $P_2O_5$ up to the range of about 65 to 75 percent $P_2O_5$ by a process such as shown in the copending application of John G. Getsinger, Serial No. 835,377, filed August 21, 1959, and assigned to the assignee of the present invention, the distribution of ortho-, pyro-, and higher polymers of the polyphosphoric acids will be somewhat dissimilar to that shown in the above-mentioned Canadian Journal of Chemistry. The presence of the impurities in such concentrated wet-process phosphoric acid and the $H_2O:P_2O_5$ ratio in acid so concentrated is believed to somewhat alter the distribution of the various polymers in this system. Although reference is made to the distribution shown in the above-mentioned Canadian Journal of Chemistry, we have found that our process may be carried out using superphosphoric acid containing upwards to 90 percent $P_2O_5$ and at the time of this disclosure the distribution of the proportions of ortho- and polyphosphoric acids above that shown in said Canadian Journal of Chemistry have not yet been fully determined. Nevertheless, our invention may be practiced with superphosphoric acids of either the electric furnace type or the concentrated wet-process type containing from about 65 percent $P_2O_5$ to about 90 percent $P_2O_5$.

We have ovecome the disadvantages inherent in both liquid mixed and dry granular fertilizers of the type shown in the prior art. We have been able to incorporate into either liquid mixed or dry granular fertilizer micronutrient elements supplied from the less expensive group of oxides rather than the more expensive water-soluble sulfates currently incorporated in some solid fertilizers, as shown in the above-mentioned article [J. Agr. Food Chem. 7, 623 (September 1959)], to a substantial extent in the present invention by a process in wihch a micronutrient source may be dissolved in superphosphoric acid and the acid ammoniated at elevated pressure and temperature to produce molten ammonium polyphosphate which is then cooled and granulated. Our process is novel in that we are able for the first time to convert water-insoluble sources of micronutrients such as oxides into a water-soluble form and thereby make them more readily available to the growing plant. The process is similar to that currently used for producing ammonium polyphosphate except for the step in which the micronutrient is dissolved in the acid. Alternatively, the acid and ammonia may first be reacted to form ammonium polyphosphate and the micronutrient source then added prior to or during granulation. While most of our work has been carried out by the first process, both are successful. The addition of the micronutrient during granulation requires less equipment and would be easier to carry out.

The ammonium polyphosphate containing the micronutrients can be dissolved in water and ammonia to produce nitrogen-phosphate liquid fertilizers with grades such as 10–34–0 or 11–37–0. Also, the other common ratios of liquid fertilizers usually produced can be made by adding the necessary amounts of supplemental materials such as urea, ammonium nitrate, or potassium chloride. Alternatively, the acid containing the micronutrient may be ammoniated to produce directly the 10–34–0 or 11–37–0 and other grades of liquid fertilizers.

It is therefore an object of the present invention to provide a process for producing mixed fertilizers of high nutrient content in either the solid or liquid form, which mixed fertilizers contain substantial amounts of the micronutrients, zinc, copper, iron, and manganese.

Another object of the present invention is to provide processes for producing mixed fertilizers of high nutrient content in either the solid or liquid form, which mixed fertilizers contain substantial amounts of the micronutrients, zinc, copper, iron, and manganese, and which mixed fertilizers have substantially improved storage properties.

Still another object of the present invention is to provide processes for producing mixed fertilizers of high nutrient content in either the solid or liquid form, which mixed fertilizers contain substantial amounts of the micronutrients, zinc, copper, iron, and manganese, and which mixed fertilizers derive their source of micronutrients from the less expensive water-insoluble sources such as oxides rather than the more expensive water-soluble sulfates, and which water-insoluble sources are converted to a water-soluble form and thereby rendered available to the growing plant.

A still further object of the present invention is to provide processes for producing mixed fertilizers of high nutrient content in either the solid or liquid form, which mixed fertilizers contain substantial amounts of the micronutrients, zinc, copper, iron, and manganese, and which mixed fertilizers contain micronutrients in quantities upwards as much as 90 times the presently considered minimum requirements.

Still further and more general objects and advantages of the present invention will appear from the more detailed description set forth below, it being understood, however, that this more detailed description is given by way of illustration and explanation only and not by way of limitations since various changes therein may be made by those skilled in the art without departing from the spirit and scope of the present invention.

In carrying out the objects of our invention in certain forms thereof, we employ processes in which dissolution of the micronutrients in superphosphoric acid was accomplished by mixing the micronutrient source and the acid. To increase the rate at which the micronutrient dissolves, the mixtures may be heated at temperatures as high as 500° F. Higher temperatures are not desirable because of the corrosiveness of the acid. A temperature range of 250° F. to 400° F. is preferred. The acid-micronutrient mixtures were ammoniated in a pressure reactor and processed to solid form in the same manner as described in the above-mentioned applications. Generally, electric furnace superphosphoric acid containing about 76 percent $P_2O_5$ was used and sufficient ammonia was added to result in the production of solid materials containing from about 6 to 7 pounds of ammonia per unit of $P_2O_5$. While this range is preferred, material containing from 5 to 8 pounds of ammonia per unit of $P_2O_5$ can be produced. Clear liquid fertilizers of 10–34–0 grade then were produced by dissolving the solids in water and adding a small amount of ammonia or acid, depending on the degree of ammoniation of the solid ammonium polyphosphate.

In some tests the micronutrient sources were added to the molten ammonium polyphosphate discharged from the pressure reactor; the mixing time ranged from 15 to 30 minutes and the temperature ranged from 375° F. to 250° F. In still other tests, the micronutrients were added to a pugmill granulator into which molten ammonium polyphosphate and recylcle fines also were fed. The temperature of the material in the pugmill was 250° F. and the retention time was 5 minutes. The preferred range of mixing temperatures is 250° F. to 425° F.; however, a range of 70° F. (room temperature) to 500° F. could be used. Above 500° F. the amount of ammonia lost would be excessively high.

The amounts of micronutrients that can be incorporated in solid ammonium polyphosphate by these processes, when added singly, are: zinc, 0.05 to 2.5 percent; copper 0.05 to 1 percent; iron, 0.1 to 9 percent; and manganese, 0.05 to 0.1 percent. As much as 0.9 percent manganese could be incorporated, however, when added in the presence of 0.9 percent of iron, zinc, and copper. The upper ranges are about the maximum amounts of micronutrients that will be water soluble in the solid product when micronutrient oxides are used. When liquid fertilizers are produced directly from the acid, the minimum values would be the same and the maximum values would be one-half of those given above. The lower ranges claimed are those amounts required present by the American Association of Fertilizer Control Officials before the micronutrient content can be claimed. It is realized that some of the amounts claimed exceed values that would be considered micronutrients by some sources; however, the fertilizer could be used as a carrier of micronutrients for mixing with fertilizers that do not contain micronutrients.

Either electric-furnace or wet-process superphosphoric acid may be used. If electric-furnace acid is used, the concentration of $P_2O_5$ should be from about 70 to 83 percent. A range of 76 to 80 percent $P_2O_5$ is preferred. Apparently, wet-process superphosphoric acids will contain from about 65 to 80 percent total $P_2O_5$ depending upon the amount of impurities present in the acid; a range of 68 to 72 percent $P_2O_5$ is preferred.

Nitrogen-phosphate liquid fertilizers with grades such as 10-34-0 or 11-37-0 can be produced by dissolving the products in water and adding ammonia. Information on the dissolution of ammonium polyphosphate without micronutrients in water is given in patent application S.N. 227,664. The other ratios of liquids fertilizers usually produced can be made also by adding the necessary amounts of supplemental materials such as urea, ammonium nitrate, or potassium chloride.

When liquid fertilizers are prepared directly from the acid containing the micronutrient, the range of $P_2O_5$ contents of electric-furnace superphosphoric acid will be from about 70 to 90 percent; a range of 76 to 80 percent $P_2O_5$ is preferred. It is realized that in previous patent applications by TVA that the upper limit claimed for the acid has been 85 percent $P_2O_5$; however, we have prepared and ammoniated acid containing 90 percent $P_2O_5$ in the laboratory. The over-all range for wet-process acid would be 65 to 80 percent $P_2O_5$ and the preferred range would be 68 to 72 percent $P_2O_5$.

Our invention, together with further objects and advantages thereof will be better understood by the consideration of the following description taken in connection with the accompanying drawings in which.

*Dissolution of micronutrients in superphosphoric acid*

Figure 1:
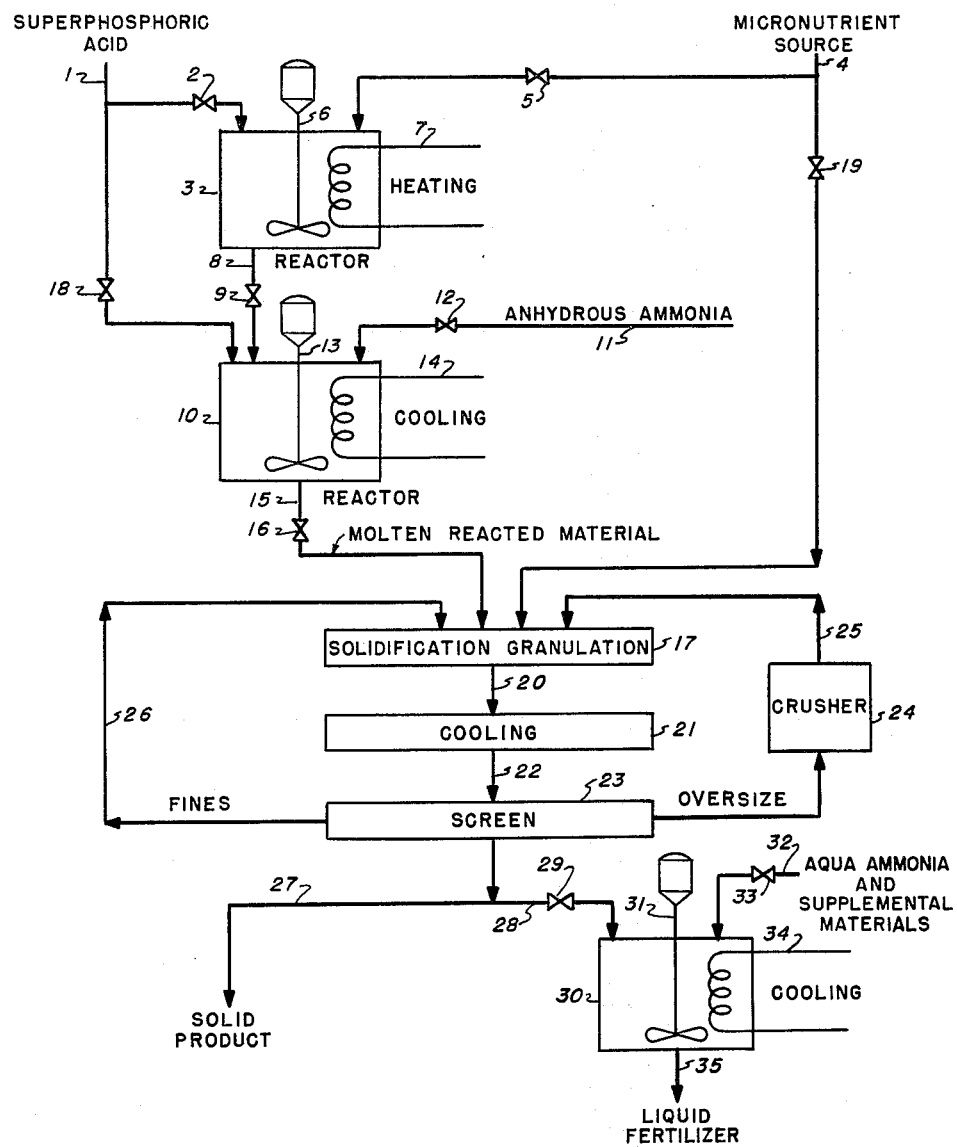
FIGURE 1 is a flowsheet illustrating the principles of our process wherein the micronutrients are incorporated in ammonium polyphosphates either by dissolution of the micronutrients in superphosphoric acid or by incorporation of the micronutrients in the melt.

Referring now more specifically to FIGURE 1, superphosphoric acid from a source, not shown, is fed through line 1 and any suitable means for controlling the rate of flow 2 into a dissolution zone comprising vessel 3. The various micronutrients from a source, not shown, are fed into vessel 3 through line 4 and means 5 for controlling the rate of flow. Vessel 3 is equipped with a motor-driven agitator 6 running at such speed as to secure rapid and intimate mixing of the acid and micronutrients to keep the resulting mixture in vigorous agitation until dissolution is complete. Heating coils 7 are located within vessel 3 and may be disposed in a baffle-like arrangement to increase the degree of agitation resulting from the agitation of agitator 6.

The mixture of superphosphoric acid containing dissolved micronutrients is discharged from vessel 3 through line 8 and any suitable means for controlling the rate of flow 9 into a reaction zone comprising vessel 10. Anhydrous ammonia from a source, not shown, is fed into vessel 10 through line 11 and means 12 for controlling the rate of flow. Vessel 10 is equipped with a motor-driven agitator 13 running at such speed as to secure rapid and intimate mixing of the acid-micronutrient mixture and anhydrous ammonia to keep the resulting mixture in vigorous agitation until reaction is complete. Cooling coils 14 are located within vessel 10 and may be disposed in a baffle-like arrangement to increase the degree of agitation resulting from the action of agitator 13. We prefer to introduce a stream of superphosphoric acid-micronutrient mixture at a steady rate of flow according to the capacity of the equipment and to vary the rate of introduction of anhydrous ammonia as may be necessary to maintain the desired pressure of excess ammonia in the reactor. The product from reactor vessel 10 is discharged as a melt through line 15 and any suitable means 16 for controlling the rate of flow into granulator 17, where it is subjected to agitation by stirring means, not shown. It has been found that agitation in vessel 17 is required in order for the molten material to set up into hard granules; otherwise, the material will upon cooling be in the form of a water-soluble, hygroscopic, amorphous mass. The resulting hard granules are fed through line 20 into cooling means 21 which may comprise a rotary cooler or other conventional cooling equipment. The cooled, hard, granular material travels from cooling means 21 via line 22 to a screening means generally illustrated as screens 23 and crusher 24. The crushed oversize material and the fine material are returned to granulator 17 via lines 25 and 26, respectively. The granular product from this process can be stored for future use or bagged and shipped for further use by passing through line 27.

The granular product or the unagitated amorphous mass can be processed into a liquid fertilizer by passing through line 28 and any suitable means 29 for controlling the rate of flow into a reaction zone comprising vessel 30. Vessel 30 is equipped with a motor-driven agitator 31 running at such speed as to secure rapid and intimate mixing. The aqueous ammonia and supplemental materials, if desired, are fed from a source not shown through line 32 and any suitable means 33 for controlling the flow into reaction vessel 30. Reaction vessel 30 is equipped also with cooling coils 34 located within the vessel and may be disposed in a baffle-like arrangement to increase the degree of agitation resulting from the action of agitator 31. The liquid fertilizer is withdrawn from vessel 30 through line 35.

*Incorporation of micronutrient in melt*

Superphosphoric acid from a source not shown is fed through line 1 and any suitable means for controlling the rate of flow 18 into a reaction zone comprising vessel 10. Anhydrous ammonia from a source not shown is fed into vessel 10 through line 11 and means 12 for controlling the rate of flow. Vessel 10 is equipped with a motor-driven agitator 13 running at such speed as to secure rapid and intimate mixing of acid and anhydrous ammonia to keep the resulting mixture in vigorous agitation until reaction is complete. Cooling coils 14 located within vessel 10 may be disposed in a baffle-like arrangement to increase the degree of agitation resulting from the action of agitator 13. We prefer to introduce a stream of superphosphoric acid at a steady rate of flow according to the capacity of the equipment and to vary the rate of introduction of anhydrous ammonia as may be necessary to maintain the desired pressure of excess ammonia in the reactor. The product from reactor vessel 10 is discharged as a melt through line 15 and any suitable means for controlling the rate of flow 16. The molten material from reactor vessel 10 is discharged into granulator 17 where micronutrients are mixed with the melt. The micronutrients are fed through line 4 from a source not shown and the rate of flow is controlled by any suitable means 19. The mixture of molten material from reactor vessel 10 and the micronutrients are subjected to agitation by stirring means not shown in granulator 17.

Processing of the molten material containing micronutrients into either a solid product or a liquid fertilizer is identical to that described previously in steps 20 through 35.

*Liquid fertilizer directly from superphosphoric acid*

Figure 2:
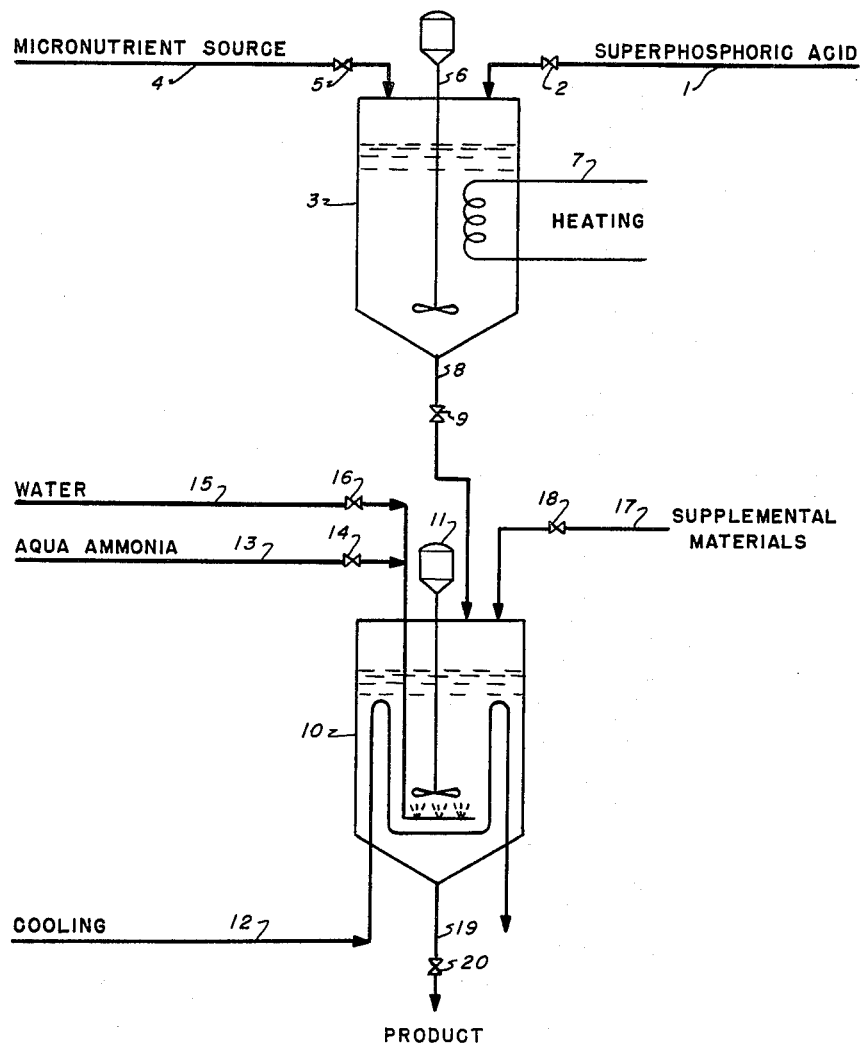
FIGURE 2 is a flowsheet illustrating the principles of our process wherein a liquid fertilizer containing micronutrients is prepared directly from superphosphoric acid without the steps of going through a melt and intermediate solid product.

Referring now more specifically to FIGURE 2, superphosphoric acid from a source not shown is fed through line 1 and any suitable means 2 for controlling the rate of flow into a dissolution zone comprising vessel 3. The micronutrient source from a source not shown is fed into vessel 3 through lines 4 and means 5 for controlling the rate of flow. Vessel 3 is equipped with a motor-driven agitator 6 running at such a speed as to secure rapid and intimate mixing of the acid and the micronutrient source and to keep the resulting mixture in vigorous agitation until dissolution is complete. Heating coils 7 are located within vessel 3 and may be disposed in a baffle-like arrangement to increase the degree of agitation resulting from the action of agitator 6. The product is discharged from dissolution vessel 3 through line 8 and any suitable means for controlling the rate of flow 9 into reaction vessel 10.

Reaction vessel 10 is equipped with a motor-driven agitator 11 running at such a speed as to secure rapid and intimate mixing of acid and other constituents normally used in liquid fertilizer production. Reaction vessel 10 is also equipped with a cooling coil 12 located within vessel 10 and may be disposed in a baffle-like arrangement to increase the degree of agitation resulting from the action of agitator 11.

When an X-X-0 grade liquid fertilizer containing micronutrients is to be made in reaction vessel 10, aqueous ammonia from a source not shown is fed to reaction vessel 10 through line 13. The rate of flow of aqueous ammonia to reaction vessel 10 is controlled by any suitable means 14. Water may be added also as required to the reaction vessel 10. The water is fed from a source not shown through line 15 and the rate of flow is controlled by any suitable means 16.

When an X-X-X grade liquid fertilizer is desired, supplemental materials such as potash salts, urea, or ammonium nitrate in addition to the water and aqua ammonia previously described would be fed to reaction vessel 10 from a source not shown through line 17 and means 18. After a suitable mixing time, the liquids of X-X-0 grade or X-X-X grade containing micronutrients will be discharged from reaction vessel 10 through line 19 into storage or shipping containers. The rate of discharge from reaction vessel 10 can be measured by any suitable means 20.

In order that those skilled in the art may better understand how the present invention can be practiced, the following examples of processes which we have used in the steps of producing solid, and more particularly clear liquid fertilizers containing micronutrients, are given by way of illustration and not by way of limitation.

EXAMPLE I

Initial tests were made in which reagent-grade oxides were added to superphosphoric acid to determine, very approximately, the maximum amounts that could be dissolved. Ferric oxide ($Fe_2O_3$), zinc oxide (ZnO), cuprous oxide ($Cu_2O$), cupric oxide (CuO), and manganese dioxide ($MnO_2$) were tested. In these tests, 200 to 4000 cubic centimeters of the acid (76 percent $P_2O_5$) was heated to 200° F. to 250° F. After the oxide was added, the mixture was agitated and heated for about 2 hours at 300° F. to 400° F. Data from these tests are shown below.

| Micronutrient added— | | Completely solubilized |
|---|---|---|
| Material | Percent by weight of element (Fe, Zn, Cu, and Mn) | |
| $Fe_2O_3$ | 2 | Yes. |
| | 5 | Yes. |
| | 10 | No. |
| ZnO | 2 | Yes. |
| | 5 | No. |
| $Cu_2O$ | 0.5 | Yes. |
| | 1.0 | No. |
| CuO | 0.25 | No. |
| $MnO_2$ | 0.06 | No. |

At least 2 percent by weight of iron as $Fe_2O_3$ and zinc as ZnO and 0.5 percent by weight of copper as $Cu_2O$ were soluble. Copper as CuO was much less soluble. The solubility of manganese as $MnO_2$ added alone was less than 0.06 percent; however, its solubility was increased in the presence of $Fe_2O_3$, ZnO, and $Cu_2O$. When all four oxides were added to the acid in amounts to supply 0.5 percent each of iron, zinc, copper, and manganese, complete dissolution resulted. When larger amounts (1 percent of each element) were tried, incomplete dissolution resulted.

EXAMPLE II

In Example I above, the approximate solubilities were reported of reagent-grade metallic oxides ($Fe_2O_3$, ZnO, CuO, $Cu_2O$, and $MnO_2$) in electric-furnace superphosphoric acid. Tests were made to determine the approximate solubilities, in the acid, of other sources of the micronutrients. The sources tested included sulfate salts ($FeSO_4 \cdot H_2O$, $Fe_2(SO_4)_3$, $ZnSO_4 \cdot H_2O$, and $CuSO_4 \cdot 5H_2O$), metals (Zn and Cu), and other oxides of manganese ($Mn_3O_4$ and MnO). Where commercial grades of materials were not available, reagent-grade materials were tested. Also tested were iron ore and several flotation concentrates, which consisted principally of mixtures of iron, zinc, and copper sulfides. The concentrates are intermediate materials in the production of sulfuric acid and metallic compounds.

Various proportions of the materials, usually in increments of 0.25 percent of the element, were mixed at room temperature with about 200 cubic centimeters of the acid (76 to 77 percent $P_2O_5$), and the mixtures were heated with vigorous agitation at temperatures of 300° F. to 400° F. generally for 1 to 3 hours. The materials were used as received without further grinding. They were of fine size (−14 mesh) except for the $Fe_2(SO_4)_3$ (−3 mesh), Cu metal (thin turnings), and the sulfide concentrates (35 percent +4 mesh and 90 percent +35 mesh). It is believed that these dissolution conditions are as severe as would be feasible in a practical operation. The mixtures in which no solids were observed after the heating were allowed to cool to room temperature (about 75° F.) to see if any precipitation occurred; however, no such precipitation was observed. The maximum amounts of the materials that were soluble under these conditions are shown in Table I along with the approximate costs of the micronutrients. Some of the costs were furnished by the suppliers of the materials; other costs were obtained from the Oil, Paint and Drug Reporter. For comparison, some of the solubility data reported in Example I above are shown also.

In general, the greatest solubilities were obtained when the micronutrients were supplied as the oxides. Except for the metals, the oxides were also the most concentrated sources of the micronutrients. As much as 5 percent by weight of iron was supplied as $Fe_2O_3$ and 2.5 percent by weight of zinc was supplied as ZnO. In some previous tests it was reported that only 0.5 percent by weight of Cu could be dissolved in the acid using $Cu_2O$. However, it was found that by more vigorous agitation as much as 1 percent by weight of Cu could be supplied from this source; 1 percent Cu could be supplied also as $CuSO_4 \cdot 5H_2O$. As much as 2.5 percent by weight of Mn could be supplied as $Mn_3O_4$. No precipitation occurred from these mixtures after storage for 1 month at 75° F. except with the ZnO addition. Zinc pyrophosphate, $Zn_3H_{10}(P_2O_7)_4$, precipitated from this mixture after 1 week of storage.

Table—I. Approximate Solubilities of Various Micronutrient Sources in Electric-Furnace Superphosphoic Acid [a]

| Material tested | | Maximum amount of element (Fe, Zn, Cu, Mn) soluble at 75° F., percent by wt.[b] | Approximate cost of micronutrient in commercial form, dollars per ton of element |
|---|---|---|---|
| Type | Fe, Zn, Cu, or Mn content, percent by wt. | | |
| Source of Iron: | | | |
| $Fe_2O_3$ | 70.0 | 5 | 435 delivered. |
| $FeSO_4.7H_2O$ | 20.1 | [e] 2 | 170 f.o.b. works. |
| $Fe_2(SO_4)_3.9H_2O$ | 20.4 | [e] 2 | 210 delivered. |
| Iron ore | 56.5 | 0.5 | 75 delivered. |
| FeS (flotation concentrate) | [c] | <0.25 | |
| Sources of Zinc: | | | |
| ZnO | 80.3 | [d] 2.5 | 325 f.o.b. works. |
| $ZnSO_4.H_2O$ | 36.0 | 0.25 | 490 delivered. |
| "Nu-Z" | 52.0 | 0.25 | 565 delivered. |
| ZnS (flotation concentrate) | [c] | 0.25 | |
| Zinc metal | 99+ | [d] 1.2 | 230 f.o.b. works. |
| Sources of Copper: | | | |
| $Cu_2O$ | 86.1 | 1 | 1,130 f.o.b. works. |
| CuO[d] | 79.8 | <0.25 | 1,200 f.o.b. works. |
| $CuSO_4.5H_2O$ | 25.5 | 1 | 1,020 delivered. |
| CuS (flotation concentrate) | [c] | <0.05 | |
| Copper metal | 99+ | 0.75 | 420 delivered. |
| Sources of Manganese: | | | |
| $MnO_2$ | 60.4 | 0.06 | 720 delivered. |
| $Mn_3O_4$ | 69.8 | 2.5 | 700 delivered. |
| MnO | 74.8 | 0.5 | 970 delivered. |
| "Nu-Manese" (impure MnO) | 48.0 | <0.03 | 325 delivered. |

[a] 76 to 77 percent total $P_2O_5$; 50 to 59 percent of total $P_2O_5$ as polyphosphates.
[b] The next highest amount tested, and found insoluble, represented an additional 0.25 percent except that with $FE_2O_3$ the increment was 5 percent and with $FeSO_4$ it was 0.5 percent. Additional amounts of $Fe_2(SO_4)_3$ were not tested.
[c] Analysis, percent by wt.—FeS: 55.0 Fe, 0.2 Zn, 0.1 Cu, 40.0 S; ZnS: 11.0 Fe, 52.0 Zn, 0.5 Cu, 33.0 S; and CuS: 35.0 Fe, 4.0 Zn, 20.0 Cu, 35.5 S.
[d] Zinc pyrophosphate, $Zn_3H_{10}(P_2O_7)_4$, precipitated after 7 days of storage at 75° F.
[e] Solubilities determined with monohydrated iron sulfates.

Liquid fertilizers of 10–34–0 grade were prepared from all the acid-micronutrient mixtures containing more than 0.1 percent by weight of the elements. In all cases, except for the mixtures made with $Mn_3O_4$ and MnO, the liquids were clear with no trace of settled solids after storage for a month at a temperature of 32° F. Manganese ammonium phosphate precipitated from the 10–34–0 liquids prepared from acids containing the $Mn_3O_4$ and MnO. With these two materials it was necessary to lower the manganese contents in the acids to 0.06 percent by weight before satisfactory 10–34–0 grade liquids could be prepared.

EXAMPLE III

Ammonium polyphosphates were prepared by ammoniation of superphosphoric acid containing the micronutrients in equipment similar to that shown in FIGURE 1. Reactor operating conditions were selected so that the degree of ammoniation would be 6 pounds of ammonia per unit of $P_2O_5$. The melt was discharged from the reactor into a container and agitated during cooling until it crystallized into a large mass and then was crushed to size. Pertinent data from the tests are shown in the following tabulation:

and tetraammonium pyrophosphate were identified as major phases. All products were soluble in water (5 percent solution of product).

The solid product containing 0.5 percent copper alone appeared to have better handling properties than the product that did not contain an additive; it crystallized in about the same length of time but could be crushed immediately after crystallization while still relatively hot. Usually, the product has to cool to room temperature before crushing can be carried out successfully. Adding the other micronutrients did not give the same improvement in handling properties nor was this improvement found in earlier tests with ferric sulfate.

Liquid fertilizers containing micronutrients

Superphosphoric acids and ammonium polyphosphates containing micronutrients have been used in the preparation of liquids of 10–34–0 grade. One liquid contained about 1 percent iron; a second liquid contained 1 percent zinc; a third liquid contained 0.3 percent copper; a fourth liquid contained 0.01 percent manganese; and a fifth liquid contained 0.3 percent each of iron, zinc, copper, and manganese. The liquids were prepared either (1) by ammoniating the acid to a pH of about 6 with aqua ammonia (20 percent N) and adding the required amount of water, or (2) by dissolving the ammonium polyphosphate in water and ammoniating to a pH of 6. With all the liquids produced from the ammonium polyphosphate containing the micronutrients, no precipitation occurred

| Test No. | Micronutrient added | N | $P_2O_5$ | Fe | Zn | Cu | Mn | Nonortho $P_2O_5$, percent of total $P_2O_5$ | Lb. $NH_3$/unit of $P_2O_5$ |
|---|---|---|---|---|---|---|---|---|---|
| 369 | $Fe_2O_3$ | 13.2 | 60.9 | 1.9 | | | | 41 | 5.3 |
| 370 | ZnO | 14.2 | 60.5 | | 2.0 | | | 49 | 5.7 |
| 372 | $Cu_2O$ | 15.0 | 60.9 | | | 0.5 | | 50 | 6.0 |
| 373 | $Fe_2O_3$, ZnO, $Cu_2O$, $MnO_2$ | 14.4 | 60.8 | 0.4 | 0.5 | 0.5 | 0.5 | 42 | 5.8 |
| 420 | $MnO_2$ | 15.5 | 62.1 | | | | 0.03 | 56 | 6.1 |

Microscopic examination of the product containing iron showed the presence of ferric ammonium phosphate. In the other products the forms in which the micronutrients were present could not be identified. Generally, ammonium orthophosphate, triammonium pyrophosphate, on storage at either 80° F. to 90° F. or 32° F. for one month.

EXAMPLE IV

In further studies of the incorporation of micronutrients in ammonium polyphosphates, products containing boron or a combination of boron and zinc were made for agronomic testing and to determine whether the addition of these micronutrients would improve the physical properties of the product. More states have reported deficiencies of boron and zinc than any of the other known micronutrients.[1] The boron was added as sodium tetraborate in the form of borax ($Na_2B_4O_7 \cdot 10H_2O$) or Agribor ($Na_2B_4O_7 \cdot 5H_2O$) in proportions calculated to give a $P_2O$-:B weight ratio of about 160:1 as is recommended for use on cotton in Mississippi.[2] Zinc oxide was added to furnish 2 percent Zn; this proportion of zinc has been used in our previous work and is in the range of zinc content desired for agronomic purposes.

*Method of preparation.*—In preparing these materials, ammonia was first reacted with electric-furnace superphosphoric acid (76.1 percent $P_2O_5$; 53 percent of $P_2O_5$ present as polyphosphates) in the laboratory pressure reactor to give a melt containing about 6 pounds of ammonia per unit of $P_2O_5$. Reactor operating conditions were: pressure, 25 p.s.i.g.; temperature, 375° F.; retention time, 30 minutes; and agitator speed, 1020 r.p.m. In all tests, the sodium tetraborate was incorporated in the melt prior to agitation. In one test, zinc oxide also was added to the melt; in another test, it was dissolved in the acid prior to ammoniation. Analyses of the products are shown in the following tabulation.

| Test No. | Boron added to melt as— | Zinc oxide added to— | Chemical analysis of product, percent by wt. | | | | W.S. polyphosphate $P_2O_5$, percent of total $P_2O_5$ | Lb. $NH_3$/ unit of $P_2O_5$ |
|---|---|---|---|---|---|---|---|---|
| | | | Total N | Total $P_2O_5$ | B | Zn | | |
| 390 | Borax | | 14.5 | 59.7 | 0.5 | | 28 | 5.9 |
| 391 | do | Melt | 14.3 | 58.7 | 0.5 | 2.0 | 27 | 5.9 |
| 398 | Agribor | Acid | 14.0 | 60.0 | 0.6 | 2.3 | 34 | 5.7 |

The grade of the products was about 14–59–0. Some hydrolysis of the polyphosphates occurred during the tests, probably from reaction of the melt with the water in the sodium tetraborate. The products made with borax and Agribor contained, respectively, 27 and 34 percent of their $P_2O_5$ in the form of polyphosphates as compared with 53 percent for the original acid. More hydrolysis probably occurred with the borax because it contains more water than the Agribor. The products were similar in appearance to ammonium polyphosphates without additives; however, the time required for the melts to crystallize was somewhat longer (20–30 vs. 15 min.). Microscopic examination failed to reveal the forms in which the boron and zinc were present in the products.

To obtain additional information on the effect of sodium tetraborate on retarding crystallization of ammonium polyphosphate, products containing 1.5 and 3.8 percent boron were produced by adding Agribor to the melt from the reactor. About 60 minutes was required for solidification of the melt containing 1.5 percent boron. The melt containing 3.8 percent boron did not solidify after agitation for 2 hours. Dunn[3] states the sodium tetraborate also retards crystallization of calcium sulfate plasters.

*Storage tests.*—The products were placed in bag storage (3½-lb. bags) at a pressure of 3.5 p.s.i. The results of 3-month inspections are shown below along with storage results of a product without additives.

| Test No. | Boron added to melt as— | Zinc oxide added to— | Lb. $NH_3$/unit of $P_2O_5$ | Storage results after 3 months at 3.5 p.s.i. | |
|---|---|---|---|---|---|
| | | | | Bag set | +2-mesh lumps, percent [a] |
| 359 [b] | | | 6.3 | Hard | 68 |
| 390 | Borax | | 5.9 | Light | 0 |
| 391 | do | Melt | 5.9 | do | 0 |
| 398 [c] | Agribor | Acid | 5.7 | Hard | 15 |

[a] After one drop.
[b] Made with electric-furnace superphosphoric acid that contained 75.9 percent total $P_2O_5$; 52 percent of the $P_2O_5$ was present as polyphosphate.
[c] Storage period of 7 weeks.

The product that contained boron as the only additive (No. 390) and the one that contained boron and zinc added to the melt (No. 391) did not cake on storage. The product that contained boron and zinc added to the melt and acid, respectively (No. 398), was caked slightly, whereas the product without additive was caked severely.

EXAMPLE V

*Bag-storage tests*

*Incorporation of Fe, Zn, Cu, B, and Mn.*—Ammonium polyphosphate containing about 6 pounds of ammonia per unit of $P_2O_5$ can be stored for only about 1 month before caking occurs. Increasing the degree of ammoniation to about 7 pounds of ammonia per unit of $P_2O_5$ improves the storage properties of the product somewhat; however, caking occurs on 3 to 6 months of storage. Various attempts have been made to extend the period of satisfacotry storage.

Coating ammonium polyphosphate with 1 or 2 percent by weight of a conditioning agent such as calcined dolomite or Attacote improves storage properties somewhat. However, clear liquid fertilizers cannot be produced from the conditioned products.

A number of materials have been incorporated in ammonium polyphosphate in attempts to improve its storage properties. The results of bag-storage tests of such products are summarized in Table II below. The tests were made in small bags (3.5-lb. capacity) and at a storage pressure of 3.5 p.s.i. Whenever sufficient product was available, the storage tests were continued until caking occurred. Except as noted, the additives were dissolved in the electric-furnace superphosphoric acid prior to neutralization in the pressure reactor.

The additives that gave the best results with products of low degrees of ammoniation (5.7 to 6.3 lb. $NH_3$/unit of $P_2O_5$) were borax (0.5 percent B), and a combination of borax (0.5 percent B) and zinc oxide (2 percent Zn). These products were in satisfactory condition after storage for 3 months.

A product containing a mixture of 0.5 percent by weight each of iron, zinc, copper, and manganese added as oxides also was in satisfactory condition after storage for 3 months but was caked after 6 months.

With products of higher degree of ammoniation (6.6 to 7.6 lb. $NH_3$/unit of $P_2O_5$), a product containing zinc metal (0.6 percent Zn) was satisfactory after 3 months of storage.

---

[1] Berger, K. C. J. Agr. Food Chem. 10, 178–81 (May–June 1962).
[2] Lancaster, J. D., Murphy, B. C., Hurt, B. C., Jr., Arnold, B. L., Coats, R. E., Albritton, R. C., and Walton, Louie. Mississippi State University, Agricultural Experiment Station, Bulletin 635, January 1962.
[3] Dunn, J. S. Chemistry and Industry 57, No. 7, 144–8 (February 12, 1938).

The results of these bag-storage tests are given in Table II below.

jaw crusher as could ammonium polyphosphates without additives.

TABLE II.—STORAGE TESTS OF AMMONIUM POLYPHOSPHATES [a] CONTAINING ADDITIVES [b]

| Test No. | Amount of element added, percent by wt. | Polyphosphate $P_2O_5$, percent of total $P_2O_5$ | Degree of ammoniation, lb. $NH_3$/unit $P_2O_5$ | Bag set and percent lumps after storage [c] at 3.5 p.s.i. for 3 months |
|---|---|---|---|---|
| 364 | None | 54 | 5.9 | H-56 |
| 359 | ___do___ | 54 | 6.3 | H-63 |
| 321 | ___do___ | 51 | 7.0 | [d] H-4 |
| | $Fe_2O_3$, ZnO, $Cu_2O$, $MnO_2$ | | | |
| 373 | 0.5% Fe, Zn, Cu, Mn each | 42 | 5.8 | L-0 |
| | ZINC METAL | | | |
| 379 | 0.6% Zn | 58 | 6.6 | L-0 |
| 386 | 0.6% Zn | 57 | 7.0 | L-0 |
| | ZINC SULFIDE CONCENTRATE (52% Zn) | | | |
| 376, 377 | 0.2% Zn | 42 | 6.3 | H-32 |
| | BORAX | | | |
| 390 | 0.5% B | 28 | 5.9 | L-0 |
| | BORON COMPOUNDS AND ZnO | | | |
| 391 | 0.5% B (borax)[e] and 2% Zn [e] | 27 | 5.9 | L-0 |
| 398 | 0.5% B (Agribor)[e] and 2.3% Zn | 34 | 5.7 | H-15 |

[a] Ammonium polyphosphate made by ammoniating electric-furnace superphosphoric acid (76% $P_2O_5$) in laboratory-scale pressure reactor.
[b] Additives were dissolved in superphosphoric acid prior to ammoniation in the reactor except as noted.
[c] Materials were stored in 3.5-pound-capacity bags. Bag set rating: L=light, M=medium, H=hard. Percent lumps=plus 2-mesh material remaining after one drop of bag on edge.
[d] Material was stored at 14 p.s.i. for 2 to 3 months of indicated storage period.
[e] Additives mixed with molten ammonium polyphosphate instead of dissolved in acid.

The polyphosphate content of the products varied from 27 to 58 percent of the total $P_2O_5$ as a result of reactions that occurred when materials containing either oxides or water of hydration were added.

EXAMPLE VI

Ammonium polyphosphates containing 2, 4, and 6 percent zinc were produced for agronomic testing. The zinc in the form of zinc oxide, was added to the molten ammonium polyphosphate from the reactor. The melt was agitated while it cooled (325° to 250° F.). Only about 8 pounds, in minus 6–plus 20-mesh size, of each product was made. Sufficient material was not produced for bag-storage tests.

In preparing these materials, ammonia was reacted with electric-furnace superphosphoric acid (76.1 percent $P_2O_5$; 54 percent of $P_2O_5$ present as polyphosphates) in the laboratory pressure reactor to give a melt containing about 6 pounds of ammonia per unit of $P_2O_5$. Reactor operating conditions were: pressure, 25 p.s.i.g.; temperature, 375° F.; retention time, 30 minutes; and agitator speed, 1020 r.p.m.

The addition of zinc as zinc oxide increased the time required for the melt to solidify from 15 minutes to about 25 minutes. The products could be crushed easily in a The grade of the zinc-free product was 15–62–0 (see Table III). All of the $P_2O_5$ was water soluble by A.O.A.C. procedure (1 g. of solid washed with 250 ml. of water in 1 hr.). No hydrolysis of the polyphosphate occurred during the production of this material.

The grades of the products containing zinc varied from about 14–60–0 to 13–57–0 depending upon the amount of zinc added. Addition of zinc oxide resulted in conversion of some of the polyphosphate (mostly pyrophosphate) to orthophosphate. The amounts of $P_2O_5$ converted to orthophosphate were roughly equivalent to the oxygen in the zinc oxide in accordance with the equation postulated below.

$$ZnO + (NH_4)_4P_2O_7 \rightarrow Zn(NH_4)_4(PO_4)_2$$

The products made using zinc oxide and containing about 2, 4, and 6 percent zinc had 50, 45, and 36 percent, respectively, of their water-soluble $P_2O_5$ as polyphosphates. Less reaction with the zinc compound will occur in pilot-plant operation where the zinc compounds are added to the pugmill and will be in contact with the molten ammonium polyphosphate at a lower temperature (about 225° F.) and for a shorter time (less than 5 min.).

The results of these tests of varying the quantity of the micronutrient, zinc, are found in Table III below.

TABLE III.—AMMONIUM POLYPHOSPHATES FOR AGRONOMIC TESTS

| Test No. | Source of zinc | Chemical analysis, percent by wt. | | | | W.S. P$_2$O$_5$, percent of total P$_2$O$_5$ | Polyphosphate P$_2$O$_5$, percent of W.S. P$_2$O$_5$ | Lb. NH$_3$ per unit of P$_2$O$_5$ |
|---|---|---|---|---|---|---|---|---|
| | | Total N | Total P$_2$O$_5$ | W.S. P$_2$O$_5$ | Zn | | | |
| 404-5, 14, 15 | None | 15.3 | 62.2 | 62.0 | | 100 | 56 | 6.0 |
| 404-1, 8 | ZnO | 14.9 | 60.6 | 60.0 | 2.3 | 99 | 50 | 6.0 |
| 404-2, 9 | ZnO | 14.4 | 59.0 | 57.9 | 4.0 | 98 | 45 | 5.9 |
| 404-3, 10 | ZnO | 13.7 | 57.6 | 54.3 | 6.5 | 94 | 36 | 5.8 |

As the zinc content was increased from 2 to 6 percent, the amount of water-soluble P$_2$O$_5$ decreased slightly from 99 percent (2 percent zinc) to a low of 94 percent (6 percent zinc from ZnO).

Liquid fertilizers of a 10-34-0 grade were prepared by dissolving the products in water and ammoniating to pH 6. No precipitates formed in liquids prepared from the zinc-free product and the products that contained 2 percent zinc. Precipitates of zinc ammonium orthophosphate, ZnNH$_4$PO$_4$, formed in the liquids prepared from the products containing 4 and 6 percent zinc.

While we have shown and described particular embodiments of our invention, modifications and variations thereof will occur to those skilled in the art. We wish it to be understood, therefore, that the appended claims are intended to cover such modifications and variations which are within the true scope of our invention.

What we claim as new and desire to secure by Letters Patent of the United States is:

1. In a process for incorporating micronutrient values into mixed fertilizers, in which process there is produced a solid high-analysis material from anhydrous ammonia and highly concentrated phosphoric acid by maintaining in a closed reaction vessel at a temperature in the range of about 300° F. to about 500° F. and under a constant positive pressure in the range from about 10 p.s.i.g. to about 1000 p.s.i.g. a mass of molten material of low viscosity, previously formed by combining said anhydrous ammonia and said phosphoric acid within said reaction vessel; continuously combining relatively small streams of said anhydrous ammonia and said highly concentrated phosphoric acid into said mass in said closed reaction vessel; continuously vigorously agitating said mass, thereby keeping substantially the entire mass well agitated and causing immediate ammoniation of said inflowing phosphoric acid; and withdrawing from the bottom of said mass surplus ammonium polyphosphate material as products, the improvement in combination therewith for incorporating micronutrient values ultimately into said withdrawn molten material and converting certain later-mentioned normally water-insoluble oxides containing micronutrient values to water-soluble forms, which improved process comprises the additional step of introducing into said superphosphoric acid prior to its introduction into said closed reaction vessel micronutrient values selected from the group consisting of oxides of iron, copper, zinc, and manganese, and mixtures thereof; and said improved process being characterized by the fact that said normally water-insoluble micronutrient sources are converted to a water-soluble form and are rendered available to the growing plant.

2. The process of claim 1 wherein each of said oxides is added to said superphosphoric acid in such proportion that the final product will contain from about 0.05 percent to about 0.9 percent of each of said micronutrient values expressed on a weight basis as Fe, Cu, Zn, and Mn.

3. The process of claim 1 wherein the incorporation of micronutrient value is singular such that only one of the several oxides is added to said superphosphoric acid prior to introduction of said superphosphoric acid into said closed reaction vessel and that the amount added thereto is in such proportion that the concentration in said withdrawn molten material expressed on a weight basis of the elemental constituent of the particular oxide used is in the following respective proportion:

|  | Percent |
|---|---|
| Fe | 0.05–5 |
| Zn | 0.05–2.5 |
| Cu | 0.05–1 |
| Mn | 0.05–0.1 |

4. In a process for incorporating micronutrient values into mixed fertilizers in which process there is produced a solid high-analysis material from anhydrous ammonia and highly concentrated phosphoric acid by maintaining in a closed reaction vessel at a temperature in the range of about 300° F. to about 500° F. and under a constant positive pressure in the range from about 10 p.s.i.g. to about 1000 p.s.i.g. a mass of molten material of low viscosity, previously formed by combining said anhydrous ammonia and said phosphoric acid within said reaction vessel; continuously combining relatively small streams of said anhydrous ammonia and said highly concentrated phosphoric acid into said mass in said closed reaction vessel; continuously vigorously agitating said mass, thereby keeping substantially the entire mass well agitated and causing immediate ammoniation of said inflowing phosphoric acid; and withdrawing from the bottom of said mass surplus ammonium polyphosphate material as product, the improvement in combination therewith for incorporating micronutrient values ultimately into said withdrawn molten material and converting certain later-mentioned normally water-insoluble oxides containing micronutrient values to water-soluble forms, which improved process comprises the additional step of introducing into said mass in said closed reaction vessel micronutrient values selected from the group consisting of oxides of iron, copper, zinc, and manganese, and mixtures thereof, and said improved process being characterized by the fact that said normally water-insoluble micronutrient sources are converted to a water-soluble form and are rendered available to the growing plant.

5. The process of claim 4 wherein each of said oxides is added to said superphosphoric acid in such proportion that the final product will contain from about 0.05 percent to about 0.9 percent of each of said micronutrient values expressed on a weight basis as Fe, Cu, Zn, and Mn.

6. The process of claim 4 wherein the incorporation of micronutrient value is singular such that only one of the several oxides is added to said molten mass in said closed reaction vessel and that the amount added thereto is in such proportion that the concentration in said withdrawn molten material expressed on a weight basis of the elemental constituent of the particular oxide used is in the following respective proportion:

|  | Percent |
|---|---|
| Fe | 0.05–5 |
| Zn | 0.05–2.5 |
| Cu | 0.05–1 |
| Mn | 0.05–0.1 |

7. In a process for incorporating micronutrient values into liquid mixed fertilizers in which process there is produced a liquid mixed fertilizer having a total plant food content of above 33 weight percent by introducing water, ammonia, and superphosphoric acid into a reaction zone, therein rapidly and intimately mixing them, controlling the proportions of water, ammonia, and superphosphoric acid introduced into said reaction zone such that the pH and specific gravity of the resulting solution are in the ranges from about 5 to 7 and from about 1.25 to 1.5 at 80° F., respectively; maintaining the temperature of the resulting solution in said reaction zone in the range from about 55° F. to 210° F. during mixing therein; and withdrawing a stable fertilizer solution containing greater than 33 weight percent total $(N+P_2O_5)$ from the mixing zone, the improvement in combination therewith for incorporating micronutrient values ultimately into said stable fertilizer solutions and converting certain later-mentioned normally water-insoluble oxides containing micronutrient values to water-soluble forms, which improved process comprises the additional step of introducing into said superphosphoric acid prior to its introduction into said reaction zone micronutrient values selected from the group consisting of oxides of iron, copper, zinc, and manganese, and mixtures thereof, and said improved process being characterized by the fact that said normally water-insoluble micronutrient sources are converted to a water-soluble form and are rendered available to the growing plant.

8. The process of claim 7 wherein each of said oxides is added to said superphosphoric acid prior to introduction of said superphosphoric acid into said reaction zone in such proportion that the final product will contain from about 0.05 percent to about 0.9 percent of each of said micronutrient values expressed on a weight basis as Fe, Cu, Zn, and Mn.

9. The process of claim 7 wherein the incorporation of micronutrient value is singular such that only one of the several oxides is added to said superphosphoric acid prior to introduction of said superphosphoric acid into said reaction zone and that the amount added thereto is in such proportion that the cncentration in said withdrawn molten material expressed on a weight basis of the elemental constituent of the particular oxide used is in the following respective proportion:

| | Percent |
|---|---|
| Fe | 0.05–5 |
| Zn | 0.05–2.5 |
| Cu | 0.05–1 |
| Mn | 0.05–0.1 |

References Cited by the Examiner

UNITED STATES PATENTS

| 2,804,382 | 8/1957 | Nikitin et al. | 71—1 |
| 2,869,996 | 1/1959 | Vierling | 71—1 |
| 2,879,151 | 3/1959 | Melville | 71—1 |
| 2,970,049 | 1/1961 | Dalton | 71—1 |
| 3,015,552 | 1/1962 | Striplin et al. | 71—1 |
| 3,019,099 | 1/1962 | Walters | 71—1 |
| 3,022,154 | 2/1962 | Potts et al. | 71—1 |

DONALL H. SYLVESTER, *Primary Examiner.*

ANTHONY SCIAMANNA, *Examiner.*

T. D. KILEY, *Assistant Examiner.*